J. H. BARKER.
APPARATUS FOR THE MAKING OF BOLTS, NUTS, SPINDLES, OR THE LIKE FROM THE BAR AUTOMATICALLY ON A MACHINE WITH TWO, FOUR, OR SIX SPINDLES.
APPLICATION FILED NOV. 12, 1917.

1,281,753. Patented Oct. 15, 1918.

inventor

John Handel Barker

UNITED STATES PATENT OFFICE.

JOHN HANDEL BARKER, OF CARMUNNOCK, BY GLASGOW, SCOTLAND.

APPARATUS FOR THE MAKING OF BOLTS, NUTS, SPINDLES, OR THE LIKE FROM THE BAR AUTOMATICALLY ON A MACHINE WITH TWO, FOUR, OR SIX SPINDLES.

1,281,753.

Specification of Letters Patent.   Patented Oct. 15, 1918.

Application filed November 12, 1917.   Serial No. 201,872.

*To all whom it may concern:*

Be it known that I, JOHN HANDEL BARKER, a citizen of Great Britain, residing at Beeches, Carmunnock, by Glasgow, in the county of Lanark and State of Scotland, have invented a new and useful Apparatus for the Making of Bolts, Nuts, Spindles, or the like from the Bar Automatically on a Machine with Two, Four, or Six Spindles.

The machine has an even number of spindles placed horizontally one above the other in a fixed housing.

Each spindle has a chuck to grip and a finger tube to feed the long bar, from which the bolt, nut, spindle or the like are to be made, these are revolving bar spindles.

Opposite each revolving bar spindle, in perfect alinement is placed a tool slide or spindle with a motion working to and from the revolving bar spindles.

Transverse to these spindles (bar and tool spindles) are severing slides at the front of the machine, and forming slides at the back of the machine.

The cams and levers connected to accomplish the various motions are so arranged, that half the number of bar spindles constituted in a machine, are operated on only at one time, by each set of motions.

By this arrangement the making of bolts, nut, spindles and the like, are divided into two periods, named the No. one period, and the No. two period.

The operation of No. one period, is the metal cutting of bolts, nuts, spindles or the like, over the whole piece, up to where the bolts, nuts, spindles or the like is severed.

The operation of No. two period is the severing of bolts, nuts, spindles, or the like made in the No. one period from the bar, then opening the chucks, feeding bars forward, and closing chucks ready for the No. one period to start again.

Each spindle or set of spindles goes through the performance of the period No. one, and the period No. two, alternately.

A machine with two spindles constituting makes one complete piece each period. A machine with four spindles constituting as shown in the Figures 1, 2, and 3, makes two complete pieces each period. A machine with six spindles constituting makes three complete pieces each period.

Figure 1:
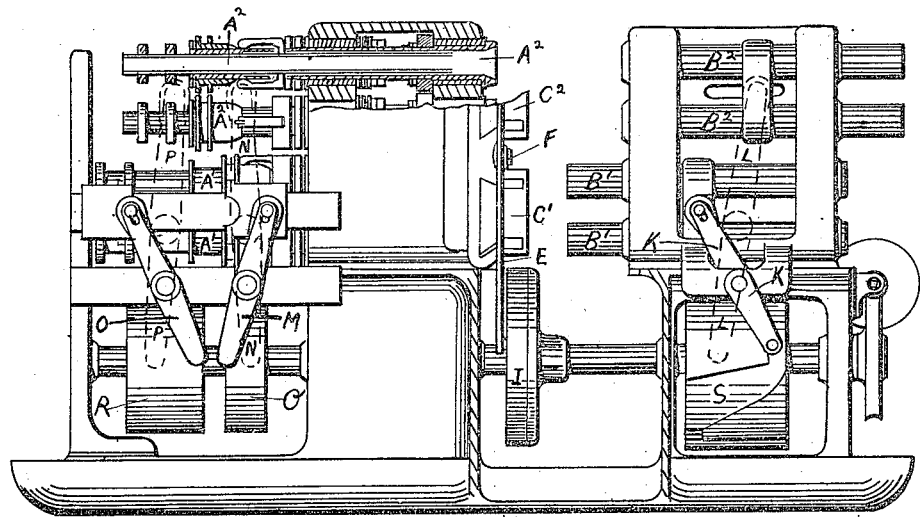
Figure 2:
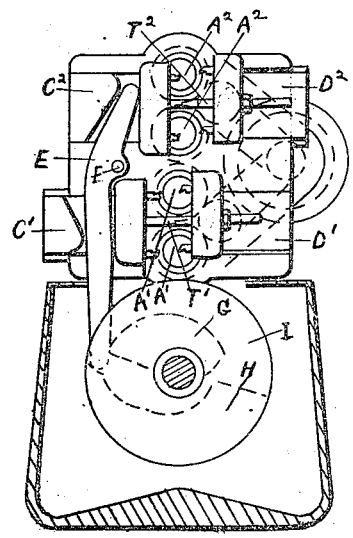
Figure 3:
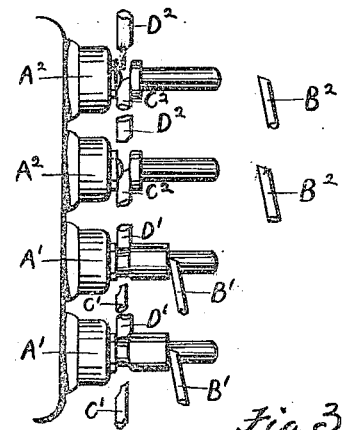

In the accompanying drawing Fig. 1 and Fig. 2 show the general arrangement and Fig. 3 a diagrammatic arrangement of a four spindle automatic machine. $A'$ and $A^2$, are revolving bar spindles each carrying a long bar from which bolts, nuts, spindles or the like are made. $B'$ and $B^2$ are the tool slides or spindles, on which tools are fixed to operate on the bars chucked in the spindles $A'$ and $A^2$.

The slides $C'$ and $C^2$ are the severing slides, and the slides $D'$ and $D^2$ are the forming slides and are operated by one lever E, pivoted at the stud F, the route of movement being from the cams G and H on the cam plate I in the drawing Fig. 2.

The lever K operates the two lowest tool slides or spindles $B'$, the lever L, at the back operates the two highest tool slides or spindles $B^2$.

The levers K and L being pivoted at two extreme points, one single pair of cams (forward and return) operate K and L at two extreme periods of time of the whole cycle of drum S; when one half of the tool slides or spindles are working, the other half of tool slides or spindles are returning and resting.

The lever M opens and closes the bars chucks on the two lowest revolving bar spindles $A'$, the lever N directly behind M opens and closes the bar chucks on the two highest revolving bar spindles $A^2$.

The lever O operates finger feeding the bars of the two lowest bar spindles $A'$, the lever P directly behind O operates finger feeding the bars of the two highest bar spindles $A^2$.

The levers M and N, working from pivots at two extreme points one single pair of cams (forward and return) operate M and N at two extreme periods of time of the whole cycle of drum Q. The levers O and P are controlled same as M and N, but from cams on the drum R.

The severing slide $C'$, and the forming slide $D'$, are connected together by an adjustable rod $T'$, which receive their motion from lever E; the severing slide $C^2$ and the forming slide $D^2$ are connected together by an adjustable rod $T^2$ which also receive their motion from lever E.

In the accompanying drawing Fig. 3 is part of the machine showing only the chucks of the revolving bar spindles $A'$ and $A^2$ with four bolts being made and is drawn in front elevation, while the tools working on the bolts are shown in plan.

All the aforementioned parts and their motions, are divided into sections of operations, called the periods and these two periods, their grouping and function of working then, (about to be described) constitute the main feature of the invention.

The period No. one takes into use four working parts of the machine, which includes the tool slides or spindles B' and B², also the forming slides D' and D².

The period No. two takes into use, six working parts of the machine which includes the severing slides C' and C² also the levers M, N. and O, P.

All the bar spindles constituting a machine can be operated on by No. one period and No. two period.

Half the working parts of No. one period operate on half the bar spindles the same time as half the working parts of No. two period operate on the other half of the bar spindles thus, all the bar spindles are getting full attention, half by No. one period, the other half by No. two period.

As No. one period finishes its allotted work No. two period starts accomplishes its allotted work then back again to the No. one period and so on alternately.

In the drawing Fig. 3 shows the two periods at work and rest in accordance with Fig. 1 and Fig. 2 but on a larger scale the tools making an actual piece being the main feature.

No. one period as shown in Fig. 3 shows the tools on B' spindles and D' slide, are into the metal cutting and forming of the bars chucked in A' spindles, notice the tools on C' slide resting.

No. two period as shown in Fig. 3, shows the tools on the slide C² are into the severing of bolts made in A² spindles, and as the slide C² returns the chucks are opened on the bar spindles A² the bars fed forward, the chucks are closed, thus finishes No. two period, notice the tools on B² slides or spindles and D² slide are resting.

I claim—

1. In a multiple spindle automatic machine in combination, a frame, a series of rotatable bar spindles placed horizontally one above the other therein, a driving means for rotating said spindles simultaneously, chucking and feeding devices for each of the spindles, means for connecting the adjacent of said chucking and feeding devices in halves and means for alternately operating adjacent halves of said devices at opposite times so that in one half the chucks opened and feeding devices operate to feed the bar while in adjacent half the chucks are closed and the feeding device returned to initial position, substantially as described.

2. In a multiple spindle automatic machine in combination, a frame, a series of rotatable bar spindles placed horizontally one above the other therein, a driving means for rotating spindles simultaneously, chucking and feeding devices for each of the spindles, means for connecting the adjacent of said devices in halves means for operating connections for said chucking and feeding devices, tool slides arranged in halves to cooperate with the halves of spindles and movable longitudinally in the frame transversely movable forming slides at the back of each half set of spindles, transversely movable severing slides at the front of each half set of spindles, said slides provided with tools for each spindle, means for connecting tool slides forming slides and severing slides and alternately operating them in opposite directions so that while the stock in one half of spindles is being operated upon the stock in the adjacent half is being fed and the tools part time inactive, substantially as described.

3. In a multiple spindle automatic machine the combination of rotating drums upon which cams are fixed forward and return and that each cam in rotating comes in contact with levers attached to frame of the machine at the front and the back, the contact point of the levers arranged to stand at two extreme points of the drums' circumference all substantially as drawn and set forth.

JOHN HANDEL BARKER.